(12) United States Patent
Hellem et al.

(10) Patent No.: US 7,228,644 B1
(45) Date of Patent: Jun. 12, 2007

(54) CARPENTER SQUARE AND TAPE MEASURE COMBINATION ASSEMBLY

(76) Inventors: Terry R. Hellem, 20116 SW. Bernice La., Aloha, OR (US) 97007; Robert J. Hollman, 20116 SW. Bernice La., Aloha, OR (US) 97007

( * ) Notice: Subject to any disclaimer, the term of this patent is extended or adjusted under 35 U.S.C. 154(b) by 0 days.

(21) Appl. No.: 11/280,755

(22) Filed: Nov. 17, 2005

(51) Int. Cl.
*G01B 3/10* (2006.01)
*B43L 7/10* (2006.01)

(52) U.S. Cl. .............. 33/760; 33/768; 33/465

(58) Field of Classification Search .......... 33/418, 33/419, 452, 464, 465, 758, 759, 760, 768
See application file for complete search history.

(56) References Cited

U.S. PATENT DOCUMENTS

| | | | |
|---|---|---|---|
| 889,570 A | 6/1908 | Ayers | |
| 1,313,432 A * | 8/1919 | Walker | 33/465 |
| 1,323,742 A | 12/1919 | Burroughs | |
| 2,745,183 A * | 5/1956 | PeQueen | 33/418 |
| 3,087,251 A | 4/1963 | Betz | |
| 3,181,242 A | 5/1965 | Cook | |
| 4,348,815 A * | 9/1982 | Hurt | 33/419 |
| 4,922,621 A * | 5/1990 | Maier | 33/465 |
| 5,077,910 A * | 1/1992 | Smith | 33/760 |
| 5,113,596 A | 5/1992 | Meyers | |
| D333,627 S | 3/1993 | Douglas | |
| 5,357,683 A * | 10/1994 | Trevino | 33/465 |
| D390,794 S | 2/1998 | Coetzee | |
| 5,782,007 A * | 7/1998 | Harris | 33/768 |
| 5,787,599 A * | 8/1998 | Clifton | 33/760 |
| 5,845,413 A | 12/1998 | Zayat, Jr. | |
| 6,178,655 B1 * | 1/2001 | Potter et al. | 33/768 |
| 6,209,213 B1 * | 4/2001 | Moe | 33/760 |
| 6,338,204 B1 * | 1/2002 | Howle | 33/758 |
| 2006/0085993 A1 * | 4/2006 | Frankowiak | 33/465 |

* cited by examiner

*Primary Examiner*—G. Bradley Bennett

(57) ABSTRACT

A carpenter square and tape measure combination assembly includes a tape measure. The tape measure includes a housing having a lower wall, an upper wall and a perimeter wall. A square assembly includes a top wall and a bottom wall attached together in a spaced configuration with respect to each other. A panel is positioned between the top and bottom walls. A rod extends through the panel and into the top and bottom walls so that the panel may be pivoted with respect to the top and bottom walls. The panel is positionable in a stored position extending from the rod to the side wall or in an extended position extending outwardly from between the top and bottom walls. A pressure sensitive adhesive is positioned on the square assembly. The adhesive secures the square assembly to the lower wall of the housing.

5 Claims, 5 Drawing Sheets

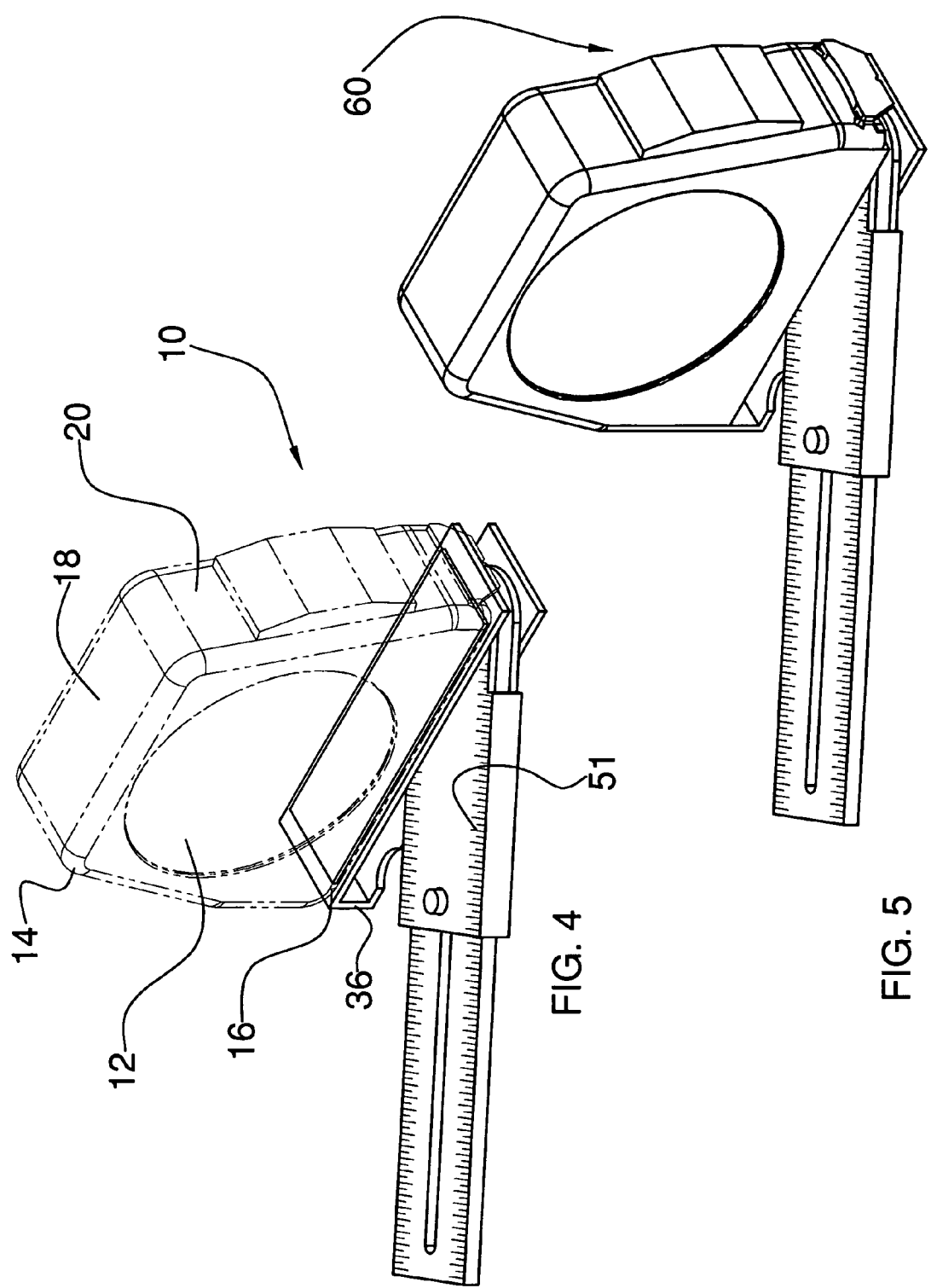

US 7,228,644 B1

CARPENTER SQUARE AND TAPE MEASURE COMBINATION ASSEMBLY

BACKGROUND OF THE INVENTION

1. Field of the Invention

The present invention relates to carpenter square devices and more particularly pertains to a new carpenter square device for which is attached to a tape measure so that a user of the tape measure will have convenient access to a square.

2. Description of the Prior Art

The use of carpenter square devices is known in the prior art. U.S. Pat. No. 5,113,596 describes a T-square device that is attachable to a tape measure. Another type of carpenter square device is U.S. Pat. Des. No. 390,794 having a tape measure having square attached thereto. U.S. Pat. No. 3,087,251 shows a tape measure having hinged section which can be angled with respect to a remainder of the tape measure. Still yet another such device is U.S. Pat. No. 3,181,242 which includes a straight edge that is rotatably coupled to a free end of a tape measure.

While these devices fulfill their respective, particular objectives and requirements, the need remains for a square device that is storable below a tape measure so that the square is easily accessible when needed but does not interfere with the use of the tape measure when not in use. Additionally, the device should be retrofittable to existing tape measures.

SUMMARY OF THE INVENTION

The present invention meets the needs presented above by generally comprising a tape measure that includes a housing having a lower wall, an upper wall and a perimeter wall extending between the upper and lower walls. A square assembly includes a top wall and a bottom wall. Each of the top and bottom walls has a generally same shape and size and each includes a first side edge, a second side edge, a first end edge and a second end edge. A side wall extends between and is attached to the first end edges of the top and bottom walls so that the top and bottom walls are aligned with and spaced from each other. A panel is positioned between the top and bottom walls. A rod extends through the panel and into the top and bottom walls so that the panel may be pivoted with respect to the top and bottom walls. The panel is positionable in a stored position extending from the rod to the side wall or in an extended position extending outwardly from between the top and bottom walls. A pressure sensitive adhesive is positioned on the square assembly. The adhesive secures the square assembly to the lower wall of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective in-use view of the present invention.

FIG. 5 is a perspective view of a second embodiment of the present invention.

DESCRIPTION OF THE PREFERRED EMBODIMENT

Figure 1:
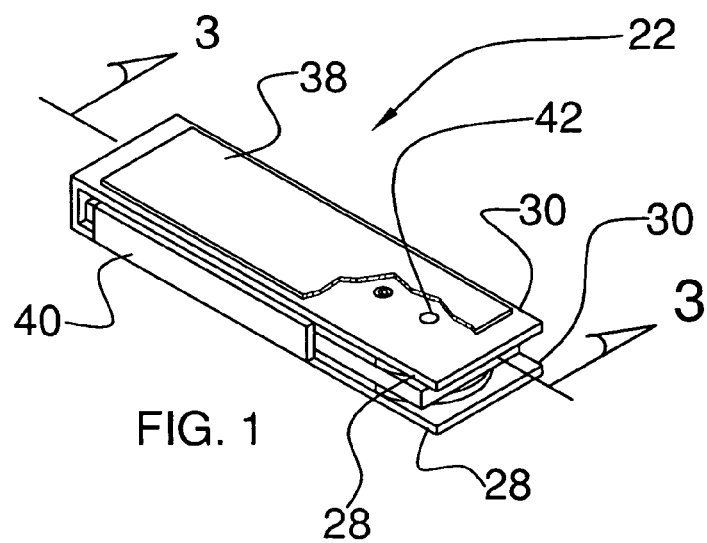
FIG. 1 is a perspective view of a carpenter square and tape measure combination assembly according to the present invention.
Figure 2:
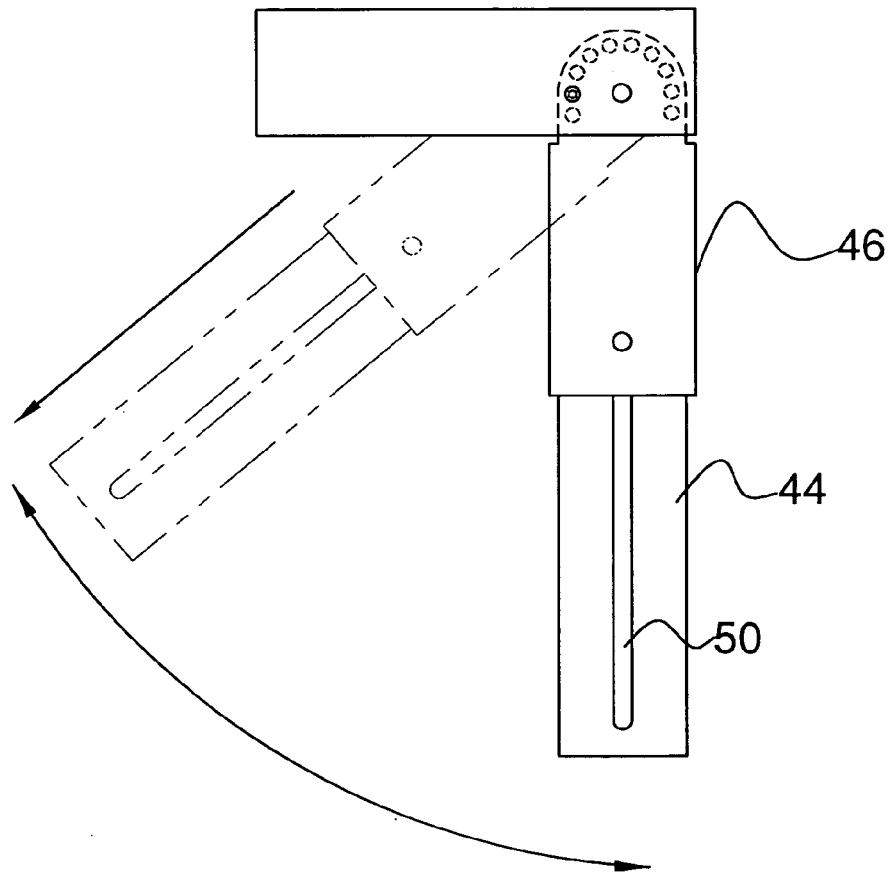
FIG. 2 is a bottom view of the present invention.
Figure 3:
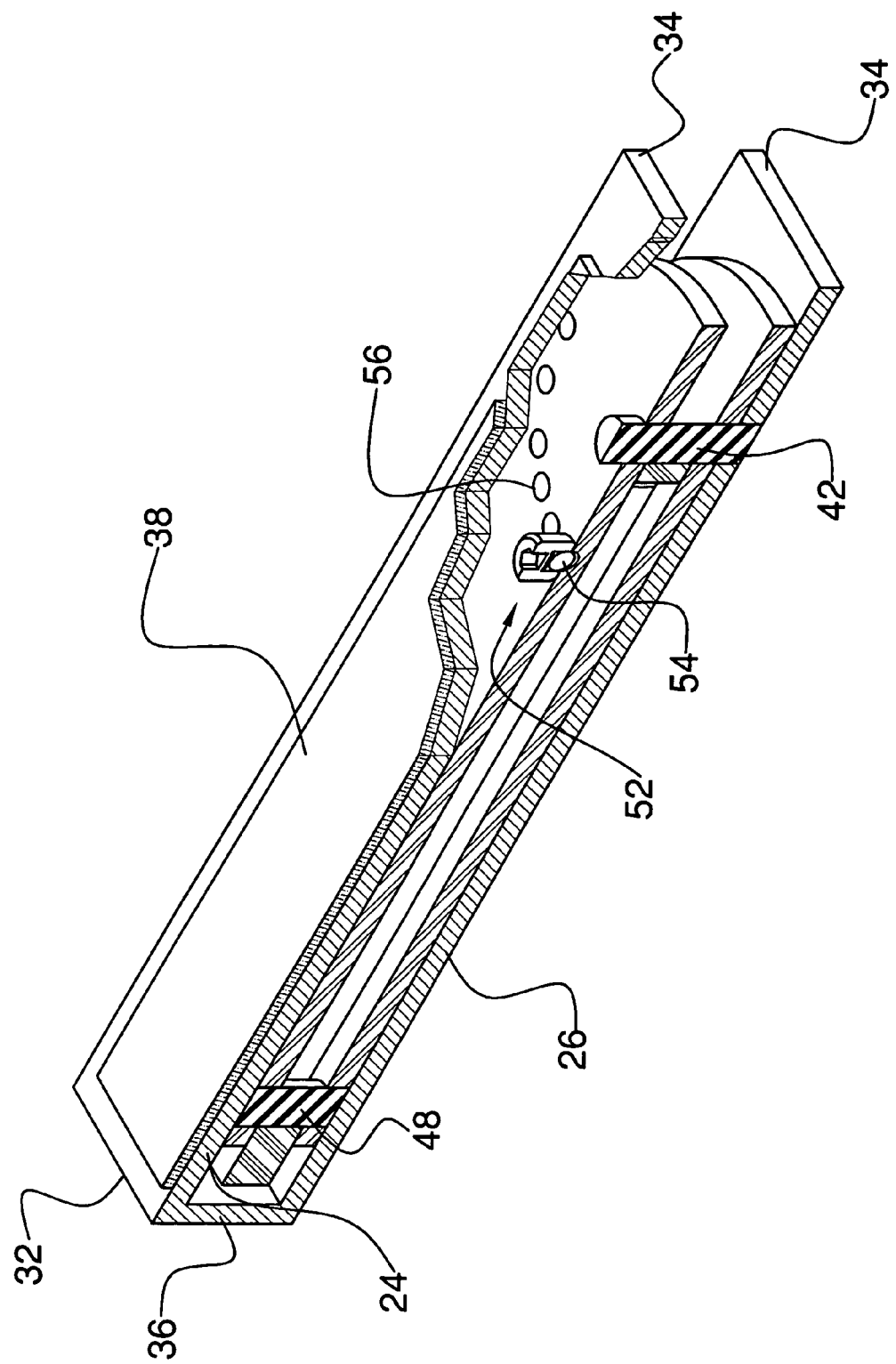
FIG. 3 is a cross-sectional view taken along line 3—3 of FIG. 1 of the present invention.
Figure 6:
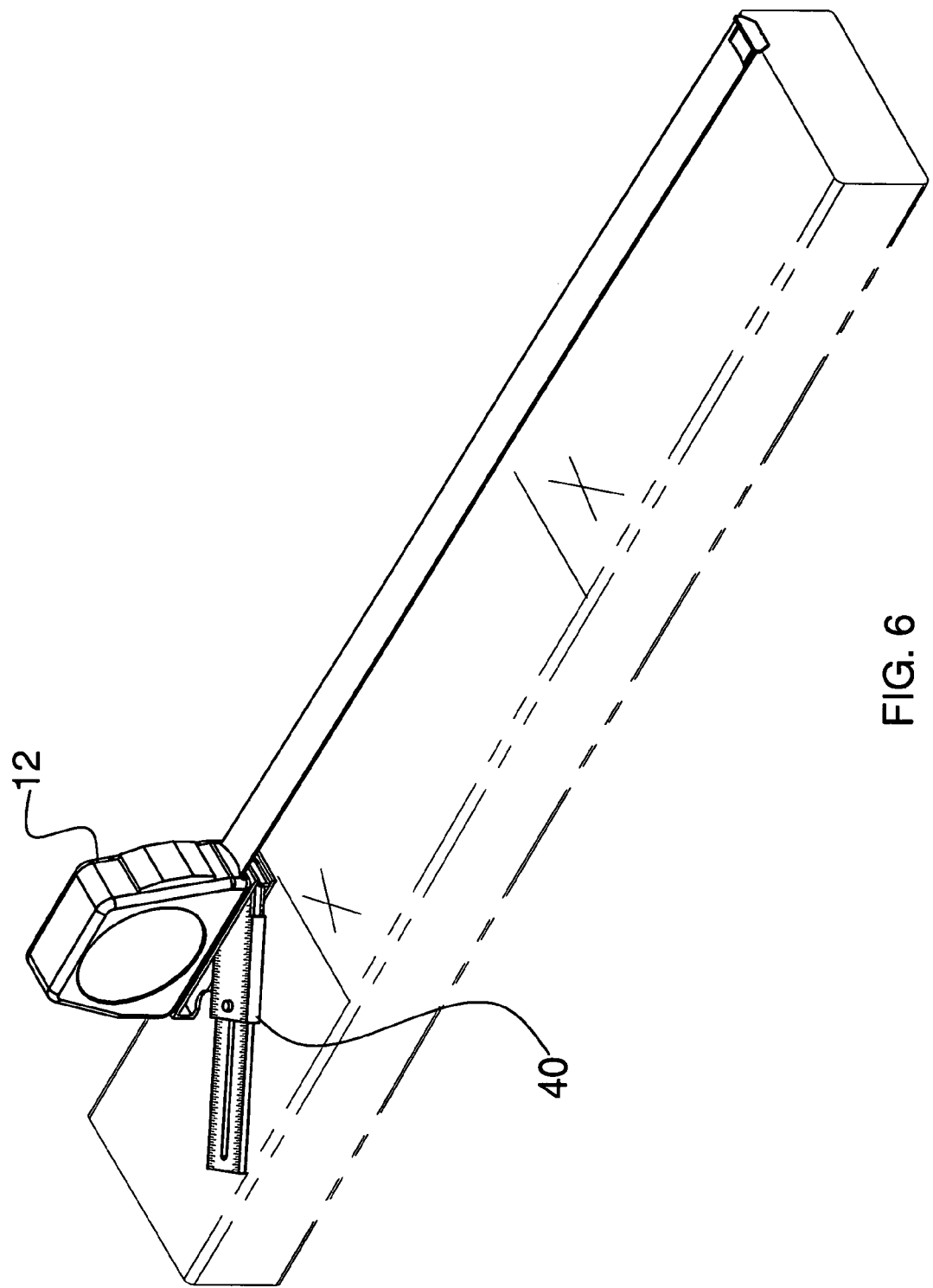
FIG. 6 is a perspective in-use view of the present invention.
Figure 7:
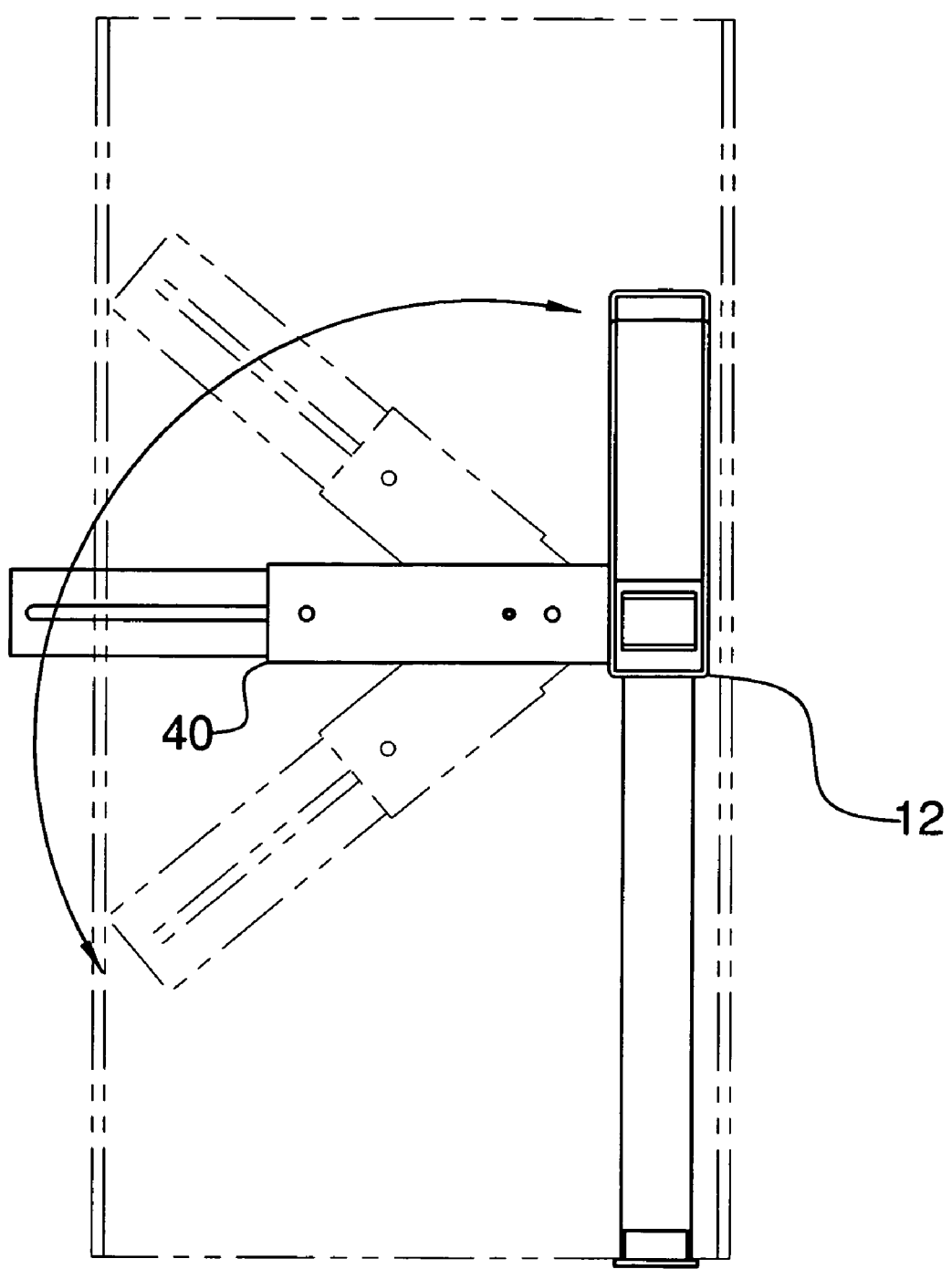
FIG. 7 is a top in-use view of the present invention.

With reference now to the drawings, and in particular to FIGS. 1 through 7 thereof, a new carpenter square device embodying the principles and concepts of the present invention and generally designated by the reference numeral 10 will be described.

As best illustrated in FIGS. 1 through 7, the carpenter square and tape measure combination assembly 10 generally comprises a generally conventional tape measure 12 that includes a housing 14 has a lower wall 16, an upper wall 18 and a perimeter wall 20 extending between the upper 18 and lower 16 walls.

A square assembly 22 includes a top wall 24 and a bottom wall 26. Each of the top 24 and bottom 26 walls has a generally same shape and size and includes a first side edge 28, a second side edge 30, a first end edge 32 and a second end edge 34. A side wall 36 extends between and is attached to the first end edges 32 of the top 24 and bottom 26 walls so that the top 24 and bottom 26 walls are aligned with and spaced from each other. A pressure sensitive adhesive 38 is positioned on the square assembly 22. The adhesive 38 secures the square assembly 22 to the lower wall 16 of the housing 14. The adhesive 38 is positioned on an upper surface of the top wall 24. The top wall 24 has generally a same size and shape the lower wall 16.

A panel 40 is positioned between the top 24 and bottom 26 walls. A rod 42 extends through the panel 40 and into the top 24 and bottom 26 walls so that the panel 40 may be pivoted with respect to the top 24 and bottom 26 walls. The rod 42 is positioned nearer to the second end edges 34 than the first end edges 32. The panel 40 is positionable in a stored position extending from the rod 42 to the side wall 36 or in an extended position extending outwardly from between the top 24 and bottom 26 walls. The panel 40 is telescoping and includes an inner portion 44 and an outer portion 46. A pin 48 extends through the inner 44 and outer 46 portions to secure the inner 44 and outer 46 portions together. The inner portion 44 has an elongated slot 50 therein. The pin 48 is positioned in the slot 50. Measurement indicia 51 may be positioned on the panel 40.

A locking assembly 52 is configured to lock the panel 40 in one of a plurality of angled relationships with respect to the top 24 and bottom 26 walls. The locking assembly 52 includes a ball detent 54 mounted in the top wall 24 and is biased toward the panel 40. The panel 40 has a plurality of indentations 56 therein. The ball detent 54 is removably positionable in one of the indentations 56. Each of the indentations 56 is equidistant from the rod 42 and the indentations 56 are positioned in an arc around the rod 42.

FIG. 5 shows a second version 60 of the combination assembly 10 wherein the square assembly 22 and the tape measure 12 are integral with each other.

In use, the square assembly 22 may be used as a conventional square. The position of the square assembly 22 on the tape measure 12 allows a person to also measure the length of an object and to determine where markings will be made with the square assembly 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A carpenter square and tape measure system, said system comprising:
   a tape measure including a housing having a lower wall, an upper wall and a perimeter wall extending between said upper and lower walls;
   a square assembly including;
      a top wall and a bottom wall, each of said top and bottom walls having a generally same shape and size and including a first side edge, a second side edge, a first end edge and a second end edge, a side wall extending between and being attached to said first end edges of said top and bottom walls such that said top and bottom walls are aligned with and spaced from each other;
      a panel being positioned between said top and bottom walls, a rod extending through said panel and into said top and bottom walls such that said panel may be pivoted with respect to said top and bottom walls, said panel being positionable in a stored position extending from said rod to said side wall or in an extended position extending outwardly from between said top and bottom walls, said panel being telescoping; and
   said top wall of said square assembly being attached to said lower wall of said housing, said lower wall and said top wall having an approximately same size.

2. The system according to claim 1, wherein said rod is positioned nearer to said second end edges than said first end edges.

3. The system according to claim 1, further including a locking assembly configured to lock said panel in one of a plurality of angled relationships with respect to said top and bottom walls.

4. The system according to claim 3, wherein said locking assembly includes a ball detent mounted in said top wall and being biased toward said panel, said panel having a plurality of indentations therein, said ball detent being removably positionable in one of said indentations, each of said indentations being equidistant from said rod and being positioned in an arc around said rod.

5. A carpenter square and tape measure system, said system comprising:
   a tape measure including a housing having a lower wall, an upper wall and a perimeter wall extending between said upper and lower walls;
   a square assembly including;
      a top wall and a bottom wall, each of said top and bottom walls having a generally same shape and size and including a first side edge, a second side edge, a first end edge and a second end edge, a side wall extending between and being attached to said first end edges of said top and bottom walls such that said top and bottom walls are aligned with and spaced from each other;
      a panel being positioned between said top and bottom walls, a rod extending through said panel and into said top and bottom walls such that said panel may be pivoted with respect to said top and bottom walls, said rod being positioned nearer to said second end edges than said first end edges, said panel being positionable in a stored position extending from said rod to said side wall or in an extended position extending outwardly from between said top and bottom walls, said panel being telescoping;
      a locking assembly being configured to lock said panel in one of a plurality of angled relationships with respect to said top and bottom walls, said locking assembly including a ball detent mounted in said top wall and being biased toward said panel, said panel having a plurality of indentations therein, said ball detent being removably positionable in one of said indentations, each of said indentations being equidistant from said rod and being positioned in an arc around said rod; and
      a pressure sensitive adhesive being positioned on said square assembly, said adhesive securing said square assembly to said lower wall of said housing, said adhesive being positioned on an upper surface of said top wall, said top wall having generally a same size and shape said lower wall.

* * * * *